United States Patent
Orazem

(10) Patent No.: US 10,307,780 B2
(45) Date of Patent: Jun. 4, 2019

(54) VIDEO MONITORING SYSTEM FOR A SPREADER HOPPER

(71) Applicant: Meyer Products, LLC, Cleveland, OH (US)

(72) Inventor: Louis M. Orazem, Chardon, OH (US)

(73) Assignee: Meyer Products, LLC, Cleveland, OH (US)

( * ) Notice: Subject to any disclaimer, the term of this patent is extended or adjusted under 35 U.S.C. 154(b) by 169 days.

(21) Appl. No.: 15/617,233

(22) Filed: Jun. 8, 2017

(65) Prior Publication Data

US 2018/0353986 A1    Dec. 13, 2018

(51) Int. Cl.
| | |
|---|---|
| *B05B 12/00* | (2018.01) |
| *B05B 13/00* | (2006.01) |
| *B05B 15/25* | (2018.01) |
| *E01H 10/00* | (2006.01) |
| *H04N 7/18* | (2006.01) |
| *E01C 19/20* | (2006.01) |

(52) U.S. Cl.
CPC .......... *B05B 12/004* (2013.01); *B05B 13/005* (2013.01); *B05B 15/25* (2018.02); *E01H 10/007* (2013.01); *H04N 7/183* (2013.01); *H04N 7/188* (2013.01); *E01C 2019/2055* (2013.01)

(58) Field of Classification Search
None
See application file for complete search history.

(56) References Cited

U.S. PATENT DOCUMENTS

| | | | | |
|---|---|---|---|---|
| 5,212,655 A | * | 5/1993 | Boehle | B61K 9/08 348/141 |
| 6,097,425 A | | 8/2000 | Behnke et al. | |
| 6,259,475 B1 | | 7/2001 | Ramachandran et al. | |
| 6,542,182 B1 | | 4/2003 | Chutorash | |
| 6,986,294 B2 | * | 1/2006 | Fromme | G01B 11/24 73/865.8 |
| 7,245,207 B1 | | 7/2007 | Dayan et al. | |
| 8,044,776 B2 | * | 10/2011 | Schofield | B60C 23/00 340/425.5 |
| 8,499,537 B2 | | 8/2013 | Correns et al. | |
| 8,505,837 B2 | * | 8/2013 | Warchola | E01C 19/203 239/672 |
| 8,749,628 B2 | * | 6/2014 | Wuestefeld | G01F 1/00 177/1 |

(Continued)

FOREIGN PATENT DOCUMENTS

| | | | | |
|---|---|---|---|---|
| DE | 4426059 A1 | * | 2/1996 | A01D 43/073 |
| DE | 4426059 A1 | | 2/1996 | |
| JP | 20090299338 | | 12/2009 | |

OTHER PUBLICATIONS

International Search Report and Written Opinion from corresponding International Application; Authorized Officer: Kremsler, Stefan; dated Nov. 20, 2018.

*Primary Examiner* — Reza Aghevli
(74) *Attorney, Agent, or Firm* — Emerson Thomson Bennett, LLC; Roger D. Emerson; Timothy D. Bennett

(57) ABSTRACT

A frozen precipitation treatment system in the form of a spreader assembly may be used with a video monitoring system. The operator within a vehicle passenger compartment may manually view a display screen to see video images within the hopper to visually assess the amount of frozen precipitation treatment material within the hopper in real time.

20 Claims, 7 Drawing Sheets

(56) References Cited

U.S. PATENT DOCUMENTS

| | | | |
|---|---|---|---|
| 2005/0047864 A1* | 3/2005 | Yamada | G01W 1/14 404/71 |
| 2005/0189444 A1* | 9/2005 | Kost | E01C 19/20 239/661 |
| 2011/0147481 A1 | 6/2011 | Warchola | |
| 2015/0181801 A1 | 7/2015 | Niemela | |
| 2017/0270381 A1* | 9/2017 | Itoh | B60Q 1/143 |
| 2018/0357484 A1* | 12/2018 | Omata | G08G 1/00 |

* cited by examiner

VIDEO MONITORING SYSTEM FOR A SPREADER HOPPER

I. BACKGROUND

A. Field of the Invention

This invention pertains to the art of spreader assemblies used to spread materials that treat frozen precipitation onto ground surfaces, and more specifically to a video monitoring system used to provide a video display of the frozen precipitation treatment material within a spreader hopper.

B. Description of Related Art

Frozen precipitation, such as snow and ice, accumulate on roadways, parking spaces, and other ground surfaces tending to make the ground surfaces slippery. It is thus desirable to remove or prevent accumulation of the frozen precipitation on such surfaces. It is known to treat such surfaces with spreader assemblies that spread (disperse) frozen precipitation treatment materials onto the surfaces.

Numerous types and sizes of spreader assemblies that treat frozen precipitation are known, and generally work well for their intended purposes. One known problem, however, is providing sufficient information to the operator regarding the amount of frozen precipitation treatment material there is within a spreader hopper. This information is important as it assists the operator in knowing how much more treatment can be done before additional frozen precipitation treatment material must be added to the spreader hopper. This problem has been addressed using certain methods described in U.S. Pat. No. 8,505,837, titled TAILGATE SPREADER HOPPER FILL STATUS SENSOR, the entirety of which is hereby incorporated by references. Known methods, however, provide only circumstantial information/data that indicates the amount of frozen precipitation treatment material within a spreader hopper. It thus would be a beneficial improvement in the art to provide direct and ongoing visual information to the operator without requiring the operator to exit the vehicle which supports the spreader assembly.

II. SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

According to some aspects of the present teaching, a frozen precipitation treatment system in the form of a spreader assembly with a video monitoring system may comprise: 1. a spreader assembly comprising: A) a hopper that: (1) is designed to be supported to an associated vehicle; and, (2) is designed to hold a solid material that treats frozen precipitation; B) a spinner mechanism that: (1) is designed to be supported to the associated vehicle; (2) comprises a spinner plate; and, (3) is operable to rotate the spinner plate to spread the solid material onto an associated ground surface that requires treatment for frozen precipitation; C) an auger mechanism that: (1) is designed to be supported to the associated vehicle; (2) comprises an auger; and, (3) is operable to rotate the auger to transfer the solid material from the hopper to the spinner plate; and, 2. an aftermarket video monitoring system comprising: A) a video camera that: (1) is supported to the hopper; (2) oriented and operable to provide video images of the solid material within the hopper; and, (3) provides indicia that, when used with the video images, indicates the amount of solid material within the hopper; B) a display screen that: (1) is designed to be viewed by an associated operator positioned within a passenger compartment of the associated vehicle; and, (2) displays the video images of the solid material within the hopper; and, C) a wireless transmitter that: (1) is supported to the associated vehicle; and, (2) wirelessly transmits the video images from the camera to the display screen.

According to other aspects of the present teaching, a frozen precipitation treatment system in the form of a spreader assembly with a video monitoring system may comprise: 1. a spreader assembly comprising: A) a hopper that: (1) is designed to be supported to an associated vehicle; and, (2) is designed to hold a material that treats frozen precipitation; and, B) a spreading mechanism that: (1) is designed to be supported to the associated vehicle; and, (2) is designed to be operable to spread the material within the hopper onto an associated ground surface that requires treatment for frozen precipitation; and, 2. a video monitoring system comprising: A) a video camera that is oriented and operable to provide video images of the material within the hopper; B) a display screen that: (1) is designed to be viewed by an associated operator positioned within a passenger compartment of the associated vehicle; and, (2) displays the video images of the material within the hopper; and, C) a transmitter that: (1) is supported to the associated vehicle; and, (2) transmits the video images from the video camera to the display screen.

According to yet other aspects of the present teaching, a method of operating a frozen precipitation treatment system may comprise the steps of: 1. providing a spreader assembly comprising: A) a hopper that: (1) is supported to a vehicle; and, (2) is designed to hold a material that treats frozen precipitation; and, B) a spreading mechanism that: (1) is supported to the vehicle; and, (2) is designed to be operable to spread the material within the hopper onto a ground surface that requires treatment for frozen precipitation; 2. providing a video monitoring system comprising: A) a video camera that is oriented and operable to provide video images of the material within the hopper; B) a display screen that: (1) is designed to be viewed by an associated operator positioned within a passenger compartment of the vehicle; and, (2) displays the video images of the material within the hopper; and, C) a transmitter that: (1) is supported to the vehicle; and, (2) transmits the video images from the video camera to the display screen; 3. operating the spreader assembly and the video monitoring system; and, 4. manually viewing the display screen in real time to assess the amount of material within the hopper.

Numerous benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
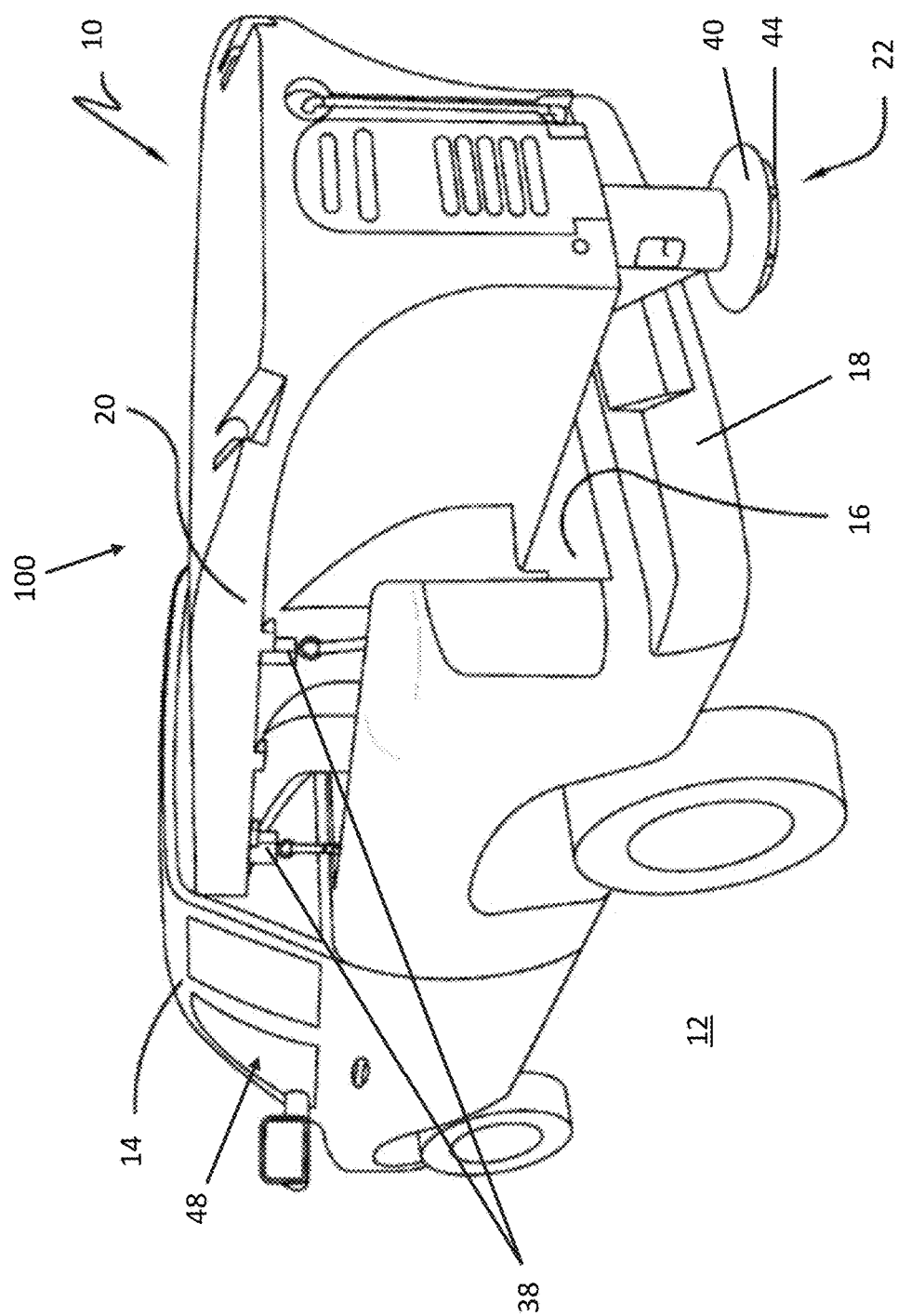
FIG. 1 is a perspective view of a vehicle with a frozen precipitation treatment system in the form of a spreader assembly and a video monitoring system.

Referring now to the drawings wherein the showings are for purposes of illustrating embodiments of the invention only and not for purposes of limiting the same, and wherein like reference numerals are understood to refer to like components, FIG. 1 shows some aspects of the present teaching with a frozen precipitation treatment system in the form of a spreader assembly 10 that may be used to treat a ground surface 12 and that may work with a video monitoring system 100. The ground surface 12 can be any that requires treatment for frozen precipitation such as roadways, parking lots and sidewalks though other ground surfaces may also work with this invention. By "frozen precipitation" it is meant snow, ice, sleet, hail, rain and other fluids that freeze or may freeze and the like. By "frozen precipitation treatment system" it is meant any device or combination of devices that are used to treat frozen precipitation. By "treat" it is meant to remove frozen precipitation and/or to prevent its accumulation. In FIG. 1 the spreader assembly 10 is supported to a vehicle 14 in the form of a pickup truck. According to other aspects of the present teaching, other vehicles may be used such as, but not limited to, other types of trucks, a car, an all-terrain vehicle (ATV) and a tractor. This invention may also have applications without the use of a vehicle. In FIG. 1 the spreader assembly 10 is supported to the bed 16 of the vehicle 14. According to other aspects of the present teaching, the spreader assembly 10 may be supported to other portions of the vehicle such as to its rear bumper 18 and/or its tailgate (not visible in FIG. 1 but well known to those of skill in the art). Such spreader assemblies are commonly referred to as tailgate spreaders.

Figure 2:
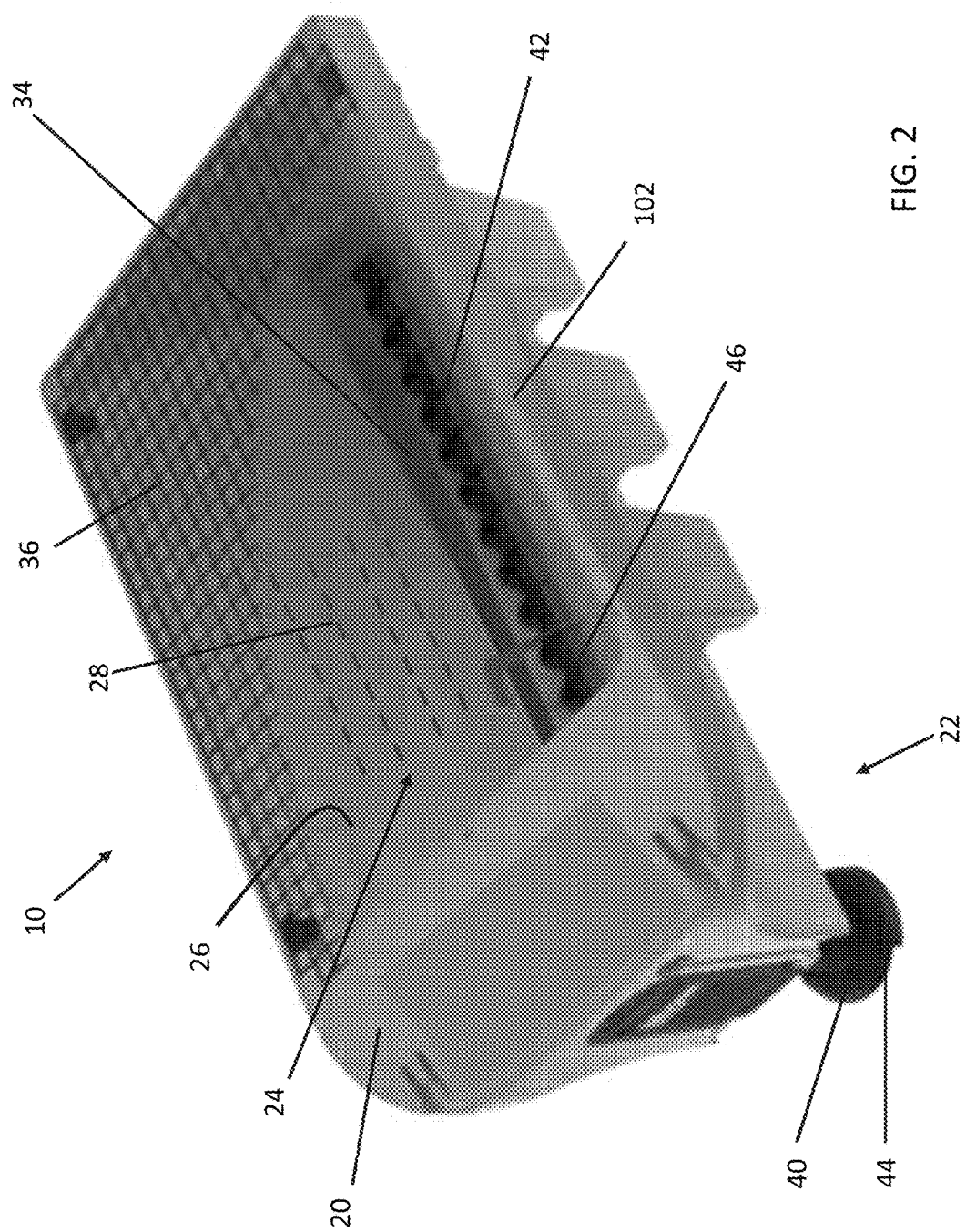
FIG. 2 is a top perspective view of a hopper.
Figure 3:
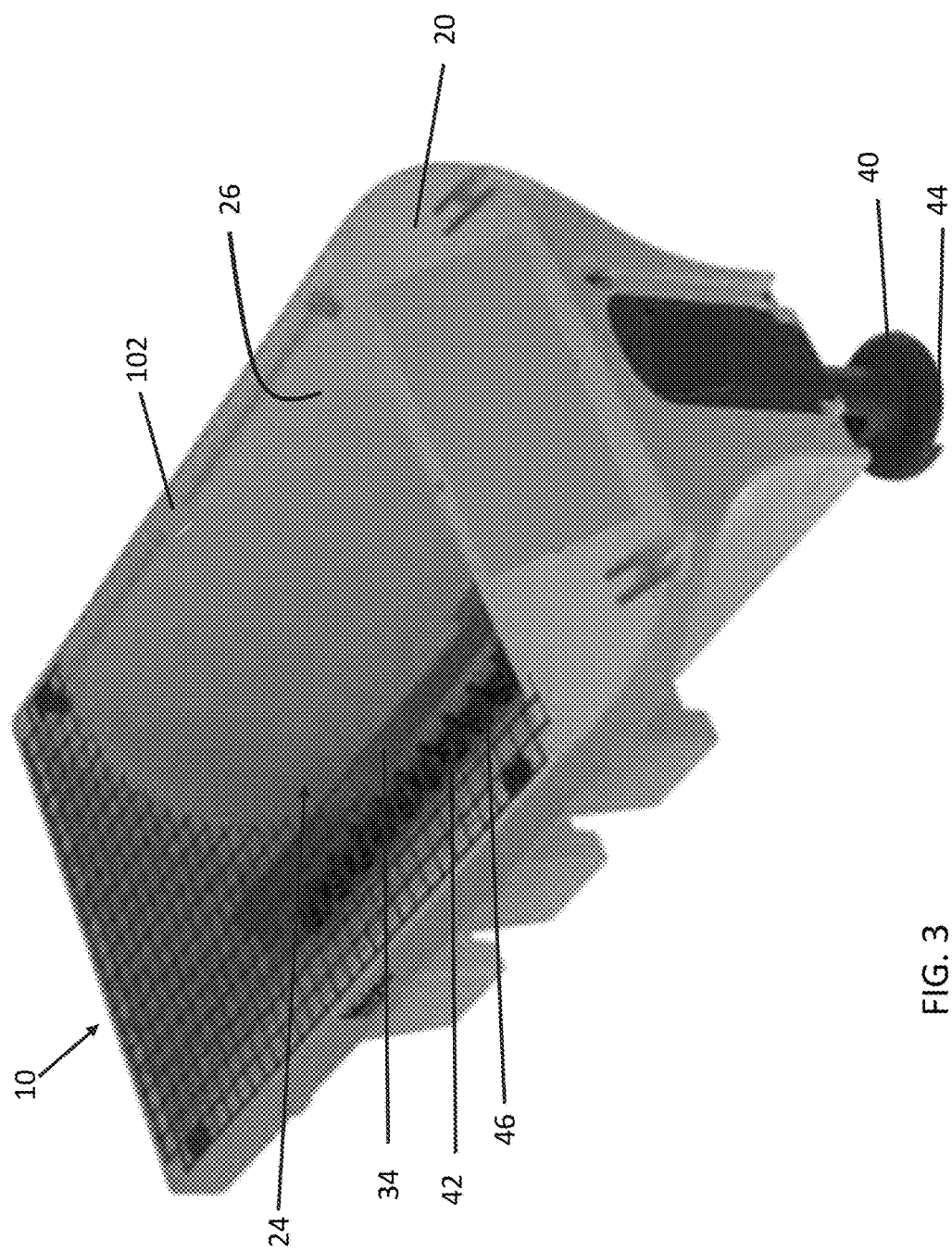
FIG. 3 is a top perspective view of a hopper similar to that shown in FIG. 2, but from a different angle.
Figure 4:
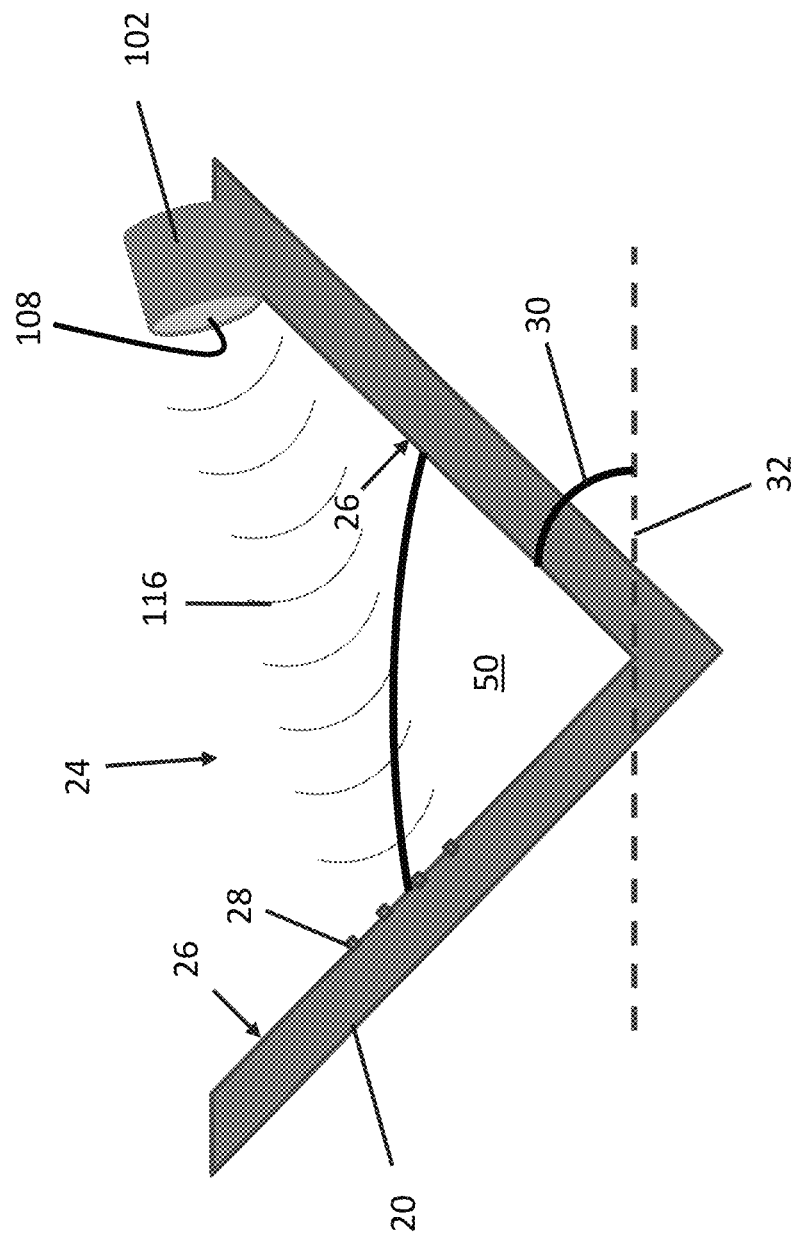
FIG. 4 is a schematic representation of a sectional side view of a hopper.

With reference now to FIGS. 1-3, the spreader assembly 10 may comprise a hopper 20 and a spreading mechanism 22. The hopper 20 may be designed to be supported to the vehicle 14 in any manner chosen with the sound judgment of a person of skill in the art. According to some aspects of the present teaching, the hopper 20 may be supported to the bed 16 of the vehicle 14, as shown in FIG. 1. The hopper could alternatively be supported to the vehicle's bumper 18 and/or tailgate as described above. The hopper 20 may have one or more holding areas 24 that are designed to hold a material 50 (shown in FIGS. 4 and 6) that treats frozen precipitation. According to some aspects of the present teaching, the frozen precipitation treatment material may be a solid; such as salt, sand or the like. According to other aspects of the present teaching, the frozen precipitation treatment material may be a fluid; such as a brine solution or the like. The hopper 20 shown, is designed to hold a solid frozen precipitation treatment material. The holding area 24 may be defined by one or more inner walls 26 that contact the frozen precipitation treatment material 50. An inner wall 26 may have indicia 28, shown in FIG. 2, in the form of visible markings as will be discussed further below. With reference now to FIG. 4, an inner wall 26 may form an acute angle 30 with a generally horizontal plane, such as horizontal plane 32. This also will be discussed further below. The hopper 20 may optionally include any other components that are well known to those of skill in the art. Non-limiting examples include a material guide 34, a screen 36, and strap attachment anchors 38, as shown in FIGS. 1-3.

With continuing reference to FIGS. 1-3, the spreading mechanism 22 may be designed to be supported to the vehicle 14 directly or indirectly (such as via the hopper 20). The spreading mechanism 22 may be designed to be operable to spread the frozen precipitation treatment material 50 onto the ground surface 12. The specific spreading mechanism 22 used can be any chosen with the sound judgment of a person of skill in the art. According to some aspects of the present teaching, the spreading mechanism 22 may include a spinner mechanism 40 and an auger mechanism 42, as shown. The spinner mechanism 40 may be designed to be supported to the vehicle 14, may comprise a spinner plate 44, and may be operable to rotate the spinner plate 44 to spread the material 50 onto the ground surface 12 that requires treatment for frozen precipitation. The auger mechanism 42 may be designed to be supported to the vehicle 14, may comprise an auger 46, and may be operable to rotate the auger 46 to transfer the material 50 from the hopper 20 to the spinner plate 44. As the operation of spinner mechanisms and auger mechanisms are well known to those of skill in the art, further details will not be provided here.

Figure 5:
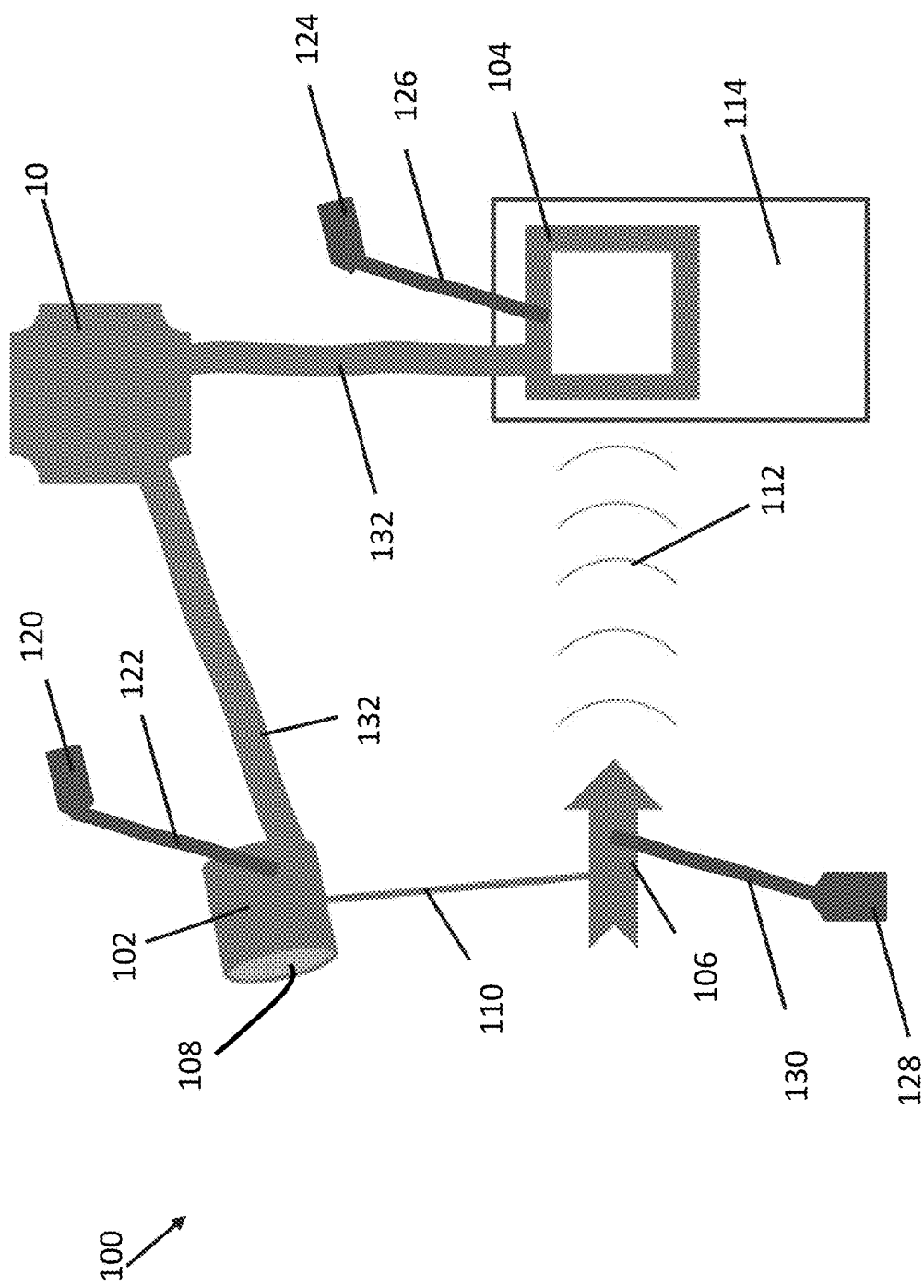
FIG. 5 is a schematic view of a video monitoring system.

With reference now to FIG. 5, the video monitoring system 100 may include a video camera 102, a display screen 104, and a transmitter 106. The video camera 102 may be oriented and operable to provide video images 110 of the material 50 within the hopper 20 as shown in FIGS. 2-4. According to some aspects of the present teaching, the video camera 102 may be supported to the hopper 20. In this case, the video camera 102 may be positioned within the hopper 20 or may be attached to the hopper via a support bracket or the like. In order to provide video images 110 of the material 50 within the hopper 20, the video camera 102 may be "aimed" with the camera lens 108 properly viewing the material 50.

With reference now to FIGS. 1 and 4-5, the display screen 104 may be designed to be viewed by an operator positioned within a passenger compartment 48 of the vehicle 14 and display the video images 110 of the material 50 within the hopper 20 taken by the video camera 102. The transmitter 106 may be supported to the vehicle 14, directly or indirectly, and may transmit the video images 110 from the video camera 102 to the display screen 104 via transmission signals 112. According to some aspects of the present teaching, the transmission signals 112 are sent through wires. According to other aspects of the present teaching, the transmission signals 112 are sent wirelessly, as indicated in FIG. 5. In this case the transmitter 106 is a wireless transmitter. The display screen 104 can be any display screen chosen with the sound judgment of a person of skill in the art. According to some aspects of the present teaching, the display screen 106 may be a standalone display screen. According to other aspects of the present teaching, the display screen 106 may be part of an electronic system 114. The electronic system 114 may be, for one example, an electronic controller used to control the spreader assembly 10. For another example, the display screen 104 may be original equipment on the vehicle 14 and thus the electronic system 114 may be part of the vehicle's entertainment and/or information system. For yet another example, the display screen 104 (as well as the video camera 102 and transmitter 106) may be part of an aftermarket video monitoring system. In this case, the electronic system 114 may be a rearview mirror package. According to some aspects of the present teaching, the display screen 106, whether standalone or part of an electronic system, may be mountable within the passenger compartment 48.

Figure 6:
FIG. 6 illustrates the view provided by a video camera that provides its own indicia.
Figure 7:
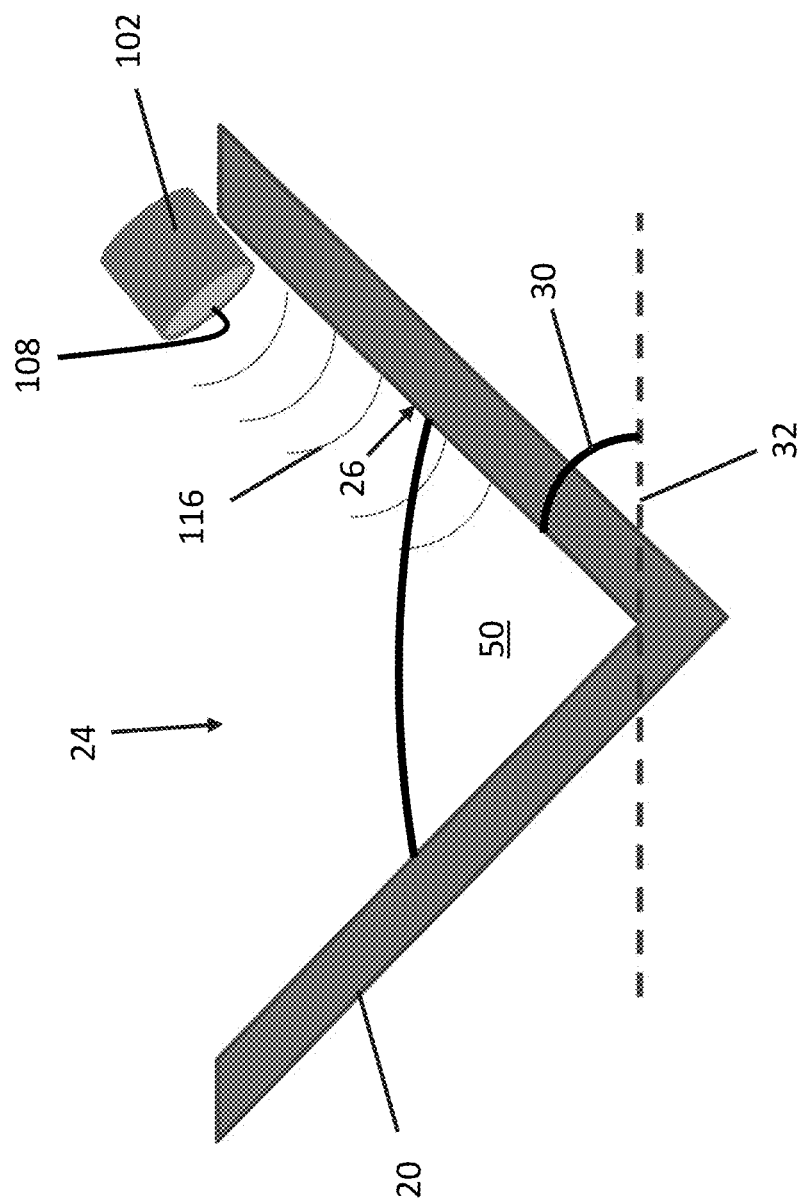
FIG. 7 is a schematic representation of a sectional side view of a hopper.

With reference now to FIGS. 4-7, according to some aspects of the present teaching, indicia 28 may be used, along with the video images 110, to indicate to the operator the amount of material 50 within the hopper 20. With reference to FIG. 4, according to some aspects of the present teaching the indicia 28 may be positioned on an inner wall 26 of the hopper 20 to indicate levels of the material 50. With the video camera properly oriented with respect to the indicia 28, such as on an opposite hopper wall, with the camera view 116 properly aimed, the operator can see the level of the material 50 with respect to the indicia 28 and thus easily determine the level of material 50 within the hopper 20 in real time. With reference to FIGS. 5-7, according to other aspects of the present teaching the indicia 28 may be provided by the video camera 102 itself. This is common, for example, with many aftermarket backup camera units. In this case, the video camera 102 may be oriented with a view looking down along the inner wall 26, as shown in FIG. 7, and at an angle corresponding to the acute angle 30 in order to align the indicia 28 provided by the video camera 102 (shown in FIG. 6) with respect to the inner wall 26 and the material 50 within the hopper 20. The camera view 116, for example, may be parallel to the surface of the inner wall 26. Once again, the operator can see the level of the material 50 with respect to the indicia 28 and thus easily determine the level of material 50 within the hopper 20 in real time.

With reference now to FIG. 5, according to some aspects of the present teaching, the video monitoring system 100 components may require power for their operation, such as electric power. Specifically, the video camera 102 may be powered by a power source 120 via electric cable 122, the display screen 104 may be powered by a power source 124 via electric cable 126, and the transmitter 106 may be powered by a power source 128 via electric cable 130. The particular power source(s) used for the video monitoring system components may be any chosen with the sound judgment of a person of skill in the art. According to some aspects of the present teaching, the video camera 102, the display screen 104, and the transmitter 106 may all be powered by the same power source. Thus, power sources 120, 124, and 128 may all be the same power source. The video camera 102, the display screen 104, and the transmitter 106 may, for example, all be powered by the spreader assembly 10. As another example, the video camera 102, the display screen 104, and the transmitter 106 may all be powered by the vehicle 14. Alternatively, the power sources 120, 124, and 128 may not all be the same power source. The video camera 102 and the transmitter 106 may, for example, be powered by the spreader assembly 10 while the display screen 104 may be powered by the vehicle 14. According to some aspects of the present teaching, the video monitoring system 100 may only be operable to display the video images 110 when it receives an electric signal 132 from the spreader assembly 10, such as from the video camera 102 and/or the display screen 104. This provides the advantage of using energy for the video monitoring system 100 only when desired, such as, for example, only when the spreader assembly 10 is in operation (that is, in an "ON" condition). According to other aspects of the present teaching, the video monitoring system 100 may be operable to display the video images 110 regardless of the status of spreader assembly 10. This provides the advantage of enabling the operator to see the amount of material within the hopper under all conditions.

With reference now to all the FIGURES, in preparation for use, the frozen precipitation treatment system 10 may be attached to the vehicle 14 as is well known by those of skill in the art. The video monitoring system 100 may be properly positioned with respect to the spreader assembly 10 and the vehicle 14. The video camera 102, for example, may be properly oriented with respect to the hopper 20, as described above, and the display screen 104 may be properly positioned within the passenger compartment 48. In use, the spreader assembly 10 may be operated as is well known by those of skill in the art. The video monitoring system 100 may be used by the operator to manually view the display screen 104 to see the video images 110 from the video camera 102 and thereby assess the amount of material 50 within the hopper 20 in real time. If indicia 28 are used, the operator may combine the video images 110 with the indicia 28 to assess the amount of material 50 within the hopper 20 as explained above. In all these ways, the operator can quickly, easily and accurately assess the amount of material 50 within the hopper 20.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Further, the "invention" as that term is used in this document is what is claimed in the claims of this document. The right to claim elements and/or sub-combinations that are disclosed herein as other inventions in other patent documents is hereby unconditionally reserved

I claim:
1. A frozen precipitation treatment system in the form of a spreader assembly with a video monitoring system comprising:
   a spreader assembly comprising:
      A) a hopper that: (1) is designed to be supported to an associated vehicle; and, (2) is designed to hold a solid material that treats frozen precipitation;
      B) a spinner mechanism that: (1) is designed to be supported to the associated vehicle; (2) comprises a spinner plate; and, (3) is operable to rotate the spinner plate to spread the solid material onto an associated ground surface that requires treatment for frozen precipitation; and,
      C) an auger mechanism that: (1) is designed to be supported to the associated vehicle; (2) comprises an auger; and, (3) is operable to rotate the auger to transfer the solid material from the hopper to the spinner plate; and,
   an aftermarket video monitoring system comprising:
      A) a video camera that: (1) is supported to the hopper; (2) oriented and operable to provide video images of the solid material within the hopper; and, (3) provides indicia that, when used with the video images, indicates the amount of solid material within the hopper;
      B) a display screen that: (1) is designed to be viewed by an associated operator positioned within a passenger compartment of the associated vehicle; and, (2) displays the video images of the solid material within the hopper; and,

C) a wireless transmitter that: (1) is supported to the associated vehicle; and, (2) wirelessly transmits the video images from the camera to the display screen.

2. The frozen precipitation treatment system in the form of a spreader assembly with a video monitoring system of claim 1 wherein:
the video monitoring system is only operable to display the video images when it receives an electric signal indicating that the spreader assembly is "ON."

3. The frozen precipitation treatment system in the form of a spreader assembly with a video monitoring system of claim 1 wherein:
the hopper comprises at least one inner wall that: (1) contacts the solid material; and, (2) forms an acute angle with a generally horizontal plane; and,
the video camera is oriented: (1) with a view looking down along the inner wall; and, (2) at an angle corresponding to the acute angle in order to align the indicia with respect to the wall and the solid material within the hopper.

4. The frozen precipitation treatment system in the form of a spreader assembly with a video monitoring system of claim 1 wherein:
the video camera is powered by the spreader assembly.

5. The frozen precipitation treatment system in the form of a spreader assembly with a video monitoring system of claim 1 wherein:
the video camera is powered by the associated vehicle.

6. A frozen precipitation treatment system in the form of a spreader assembly with a video monitoring system comprising:
a spreader assembly comprising:
A) a hopper that: (1) is designed to be supported to an associated vehicle; and, (2) is designed to hold a material that treats frozen precipitation; and,
B) a spreading mechanism that: (1) is designed to be supported to the associated vehicle; and, (2) is designed to be operable to spread the material within the hopper onto an associated ground surface that requires treatment for frozen precipitation; and,
a video monitoring system comprising:
A) a video camera that is oriented and operable to provide video images of the material within the hopper;
B) a display screen that: (1) is designed to be viewed by an associated operator positioned within a passenger compartment of the associated vehicle; and, (2) displays the video images of the material within the hopper; and,
C) a transmitter that: (1) is supported to the associated vehicle; and, (2) transmits the video images from the video camera to the display screen.

7. The frozen precipitation treatment system in the form of a spreader assembly with a video monitoring system of claim 6 wherein:
the video monitoring system is only operable to display the video images when it receives an electric signal indicating that the spreader assembly is "ON."

8. The frozen precipitation treatment system in the form of a spreader assembly with a video monitoring system of claim 6 wherein:
the display screen is part of an electronic controller used to control the spreader assembly.

9. The frozen precipitation treatment system in the form of a spreader assembly with a video monitoring system of claim 6 wherein:
the display screen is original equipment on the associated vehicle.

10. The frozen precipitation treatment system in the form of a spreader assembly with a video monitoring system of claim 6 wherein:
the display screen is mountable within the passenger compartment of the associated vehicle.

11. The frozen precipitation treatment system in the form of a spreader assembly with a video monitoring system of claim 6 further comprising:
indicia that, when used with the video images, indicates the amount of material within the hopper; and,
wherein the indicia comprises visible markings positioned on an inner surface of the hopper.

12. The frozen precipitation treatment system in the form of a spreader assembly with a video monitoring system of claim 6 further comprising:
indicia that, when used with the video images, indicates the amount of material within the hopper; and,
wherein the indicia are provided by the video camera.

13. The frozen precipitation treatment system in the form of a spreader assembly with a video monitoring system of claim 6 wherein:
the video camera is powered by the spreader assembly.

14. The frozen precipitation treatment system in the form of a spreader assembly with a video monitoring system of claim 6 wherein:
the video camera is powered by the associated vehicle.

15. A method of operating a frozen precipitation treatment system comprising the steps of:
1. providing a spreader assembly comprising:
A) a hopper that: (1) is supported to a vehicle; and, (2) is designed to hold a material that treats frozen precipitation; and,
B) a spreading mechanism that: (1) is supported to the vehicle; and, (2) is designed to be operable to spread the material within the hopper onto a ground surface that requires treatment for frozen precipitation;
2. providing a video monitoring system comprising:
A) a video camera that is oriented and operable to provide video images of the material within the hopper;
B) a display screen that: (1) is designed to be viewed by an associated operator positioned within a passenger compartment of the vehicle; and, (2) displays the video images of the material within the hopper; and,
C) a transmitter that: (1) is supported to the vehicle; and, (2) transmits the video images from the video camera to the display screen;
3. operating the spreader assembly and the video monitoring system; and,
4. manually viewing the display screen in real time to assess the amount of material within the hopper.

16. The method of operating a frozen precipitation treatment system of claim 15 wherein step 3 comprises the step of:
only operating the video monitoring system when the video monitoring system receives an electric signal indicating that the spreader assembly is "ON."

17. The method of operating a frozen precipitation treatment system of claim 15 wherein:
step 1 comprises the step of: providing indicia in the form of markings positioned on an inner surface of the hopper; and
step 4 comprises the step of: combining the video images with the indicia to assess the amount of material within the hopper.

18. The method of operating a frozen precipitation treatment system of claim 15 wherein:
    step 2 comprises the step of: providing the video camera with indicia; and
    step 4 comprises the step of: combining the video images with the indicia to assess the amount of material within the hopper.

19. The method of operating a frozen precipitation treatment system of claim 15 further comprising the step of:
    powering the video camera with the spreader assembly.

20. The method of operating a frozen precipitation treatment system of claim 15 further comprising the step of:
    powering the video camera with the associated vehicle.

\* \* \* \* \*